United States Patent [19]

Bailey, Jr.

[11] Patent Number: 4,621,851

[45] Date of Patent: Nov. 11, 1986

[54] SAFETY HOOK

[75] Inventor: James T. Bailey, Jr., Van Buren, Ark.

[73] Assignee: United States Forgecraft Corporation, Fort Smith, Ark.

[21] Appl. No.: 803,095

[22] Filed: Nov. 27, 1985

[51] Int. Cl.4 .............................................. B66C 1/36
[52] U.S. Cl. .................................. 294/82.2; 24/233; 24/241 SB
[58] Field of Search ........................ 294/82.19–82.31, 294/82.33; 24/233–235, 241 P, 241 PP, 241 PS, 241 S, 241 SB, 241 SP

[56] References Cited

U.S. PATENT DOCUMENTS

| 516,897 | 3/1894 | McMillan | 24/233 |
| 2,492,991 | 1/1950 | Hanna | 24/233 |
| 2,514,656 | 7/1950 | Manson | 24/241 PP |
| 3,008,210 | 11/1961 | Stovern | 294/82.19 |
| 3,575,458 | 4/1971 | Crook et al. | 294/82.2 |

FOREIGN PATENT DOCUMENTS 1429798 1/1966 France .............................. 294/82.19
12880 of 1909 United Kingdom ................ 24/233
1527238 10/1978 United Kingdom ............. 294/82.2

Primary Examiner—Johnny D. Cherry
Attorney, Agent, or Firm—Salter & Michaelson

[57] ABSTRACT

A safety-hook construction comprises a hook-shaped body having spaced first and second legs which cooperate to define a mouth on the body, a closure member pivotally mounted on the body and a locking member pivotally mounted on the closure member. The safety hook is normally biased to a closed position wherein the closure member obstructs the mouth on the body, wherein the locking member engages the inner surface of the first leg to prevent the closure member from being pivoted inwardly, and wherein a pair of thumb tabs on the locking member extend outwardly along opposite sides of the first leg. The safety hook is movable to an open position by grasping the body in the hand and drawing the thumb tabs along the first leg so that the locking member is pivoted toward the closure member and the closure member is pivoted inwardly until it no longer obstructs the mouth.

6 Claims, 5 Drawing Figures

SAFETY HOOK

BACKGROUND AND SUMMARY OF THE INVENTION

The instant invention relates to safety equipment and more particularly to a safety hook of the type which is operable for securing safety belts, safety harnesses and the like to safety lines.

The importance of utilizing safety lines for protecting workers who are working in elevated areas from serious accidental falls has long been recognized. Accordingly, workers in the construction industry and other industries normally wear safety lines whenever it becomes necessary for them to work in open or exposed areas at high elevations. In this regard, while it is understood that a safety line will not actually prevent a worker from falling, it will normally limit the extent of a fall to only a few feet so that the worker will normally suffer only minimal injuries.

In most cases, in order to effectively secure a worker to a safety line, the worker must either wear a safety harness or a safety belt which is detachably securable to a safety line with one or more safety hooks. However, it is apparent that in order for a safety hook to be effective, it must be rugged and durable, and it must not be prone to becomming inadvertently detached from a safety line. Further, a safety hook must be simple and easy to operate by a worker to assure that the worker does not neglect to attach himself or herself to a safety line for reasons of convenience.

While a wide variety of different types of safety-hook constructions have been heretofore available, they have not always been entirely effective. Specifically, many of the heretofore available safety-hook constructions have not been both easily operable for securing workers to safety lines and effectively adapted for preventing inadvertent disengagement from safety lines. In this regard, in order for a safety hook to be easily operable for securing a worker to a safety line, it should be capable of being easily manipulated with one hand so that the worker can easily attach it to or detach it from a safety line. On the other hand, in order for a safety hook to be adapted so that it is not inadvertently disengageable from a safety line, it must include a reliable locking mechanism which is operative for securing or locking the safety hook in a closed position wherein it cannot easily be inadvertently detached from a safety line.

The devices disclosed in the U.S. patents to FROM No. 1,194,005; LEMEX No. 1,669,418; BAKER No. 1,711,440; YINGLING No. 1,914,189; MANSON No. 2,514,656; CROCK, JR., ET AL No. 3,575,458; and the British patent to M.S. GIBB LTD. No. 1,527,238 represent the closest prior art to the instant invention of which the applicant is aware. However, since these references fail to teach the structural features of the safety hook of the instant invention, and since they also fail to teach a safety-hook construction which is operative with the same degree of effectiveness, simplicity and reliability as the safety hook of the instant invention, they are believed to be of only general interest.

The instant invention provides an effective safety hook which is generally similar in construction to the safety hook disclosed in the hereinabove cited British patent to M.S. Gibb Ltd. No. 1,527,238, although it represents a significant improvement thereover. Specifically, the safety hook of the instant invention comprises a hook-shaped body having spaced first and second legs which cooperate to define a mouth along one edge of the body, a closure member which is pivotally attached to the first leg so that it is movable between a closed position wherein the mouth is obstructed by the closure member and an inwardly pivoted open position wherein the mouth is at least partially unobstructed, and a locking member which is mounted on the closure member and operative for locking it in the closed position. The locking member is of elongated configuration, it is pivotally mounted at one end thereof on the closure member and it terminates in a free end. Further, the locking member is biased to an outwardly pivoted locked position wherein the free end thereof engages the inner edge of the first leg to prevent the closure member from being pivoted inwardly from the closed position thereof to the open position thereof. The locking member is, however, manually pivotable toward the closure member to move it to an unlocked position thereof wherein the closure member can be pivoted inwardly to the open position thereof. However, in contrast to the safety-hook construction disclosed in the British patent to M.S. Gibb Ltd., the safety-hook construction of the instant invention further comprises at least one thumb tab which is preferably integrally attached to the locking member so that it extends past the free end thereof and outwardly along one side of the first leg of the body portion when the locking member is in the lcoked position thereof. The thumb tab is depressible to pivot the locking member toward the unlocked position thereof, and the locking member and the closure member are preferably dimensioned and configured so that when the thumb tab is depressed to pivot the locking member toward the unlocked position thereof, the thumb tab travels along one side of the first leg, and the closure member simultaneously moves inwardly to the open position thereof. In the preferred embodiment, the safety hook of the instant invention comprises a pair of the thumb tabs which extend past the free end of the locking member and along opposite sides of the first leg when the locking member is in the locked position thereof. Accordingly, the thumb tabs cooperate to define a notch therebetween, and the first leg of the body is received in the notch so that the thumb tabs retain the free end of the locking member against lateral movement with respect to the first leg. Further, in the preferred embodiment, the closure member and the locking member are dimensioned and configured so that when the locking member is moved to the unlocked position thereof, the two thumb tabs travel along opposite sides of the first leg. Still further in the preferred embodiment, the first leg of the body is formed with recesses along the opposite sides thereof which are positioned so that the thumb tabs travel adjacent the recesses as the locking member is moved between the locked and unlocked positions thereof.

Accordingly, it is seen that the instant invention provides an effective safety hook which is both reliable and easy to operate and which represents a significant improvement over the heretofore known safety-hook constructions, including the one disclosed in the British patent to M.S. Gibb Ltd. The safety-hook construction of the instant invention is easily operable with one hand simply by grasping it in the hand and moving the thumb tabs downwardly along the first leg toward the palm of the hand. This causes the locking member to be pivoted on the closure member to an unlocked position, and it simultaneously causes the closure member to be pivoted inwardly on the body to an open position. This entire operation is made substantially easier by the thumb tabs, since they allow an operator to move the locking member to an unlocked position simply by drawing the thumb tabs downwardly along the sides of the first leg. Further, because of the simplicity with which the safety hook can be operated, it can easily be moved to an unlocked, open position with one hand without requiring an operator to insert a finger or thumb into the open interior portion of the safety hook to move the locking member. Still further, since the locking member is biased to a position wherein it is pivoted outwardly from the closure member, the locking member is automatically returned to the locked position and the closure member is automatically returned to the closed position as soon as the thumb tabs are released. In addition, since the thumb tabs extend along opposite sides of the first leg of the body, they prevent the locking member from being moved laterally with respect to the body so that they provide an extra margin of safety against inadvertent opening of the safety hook.

Accordingly, it is a primary object of the instant invention to provide an improved safety-hook construction which is easily operable with one hand and which is not prone to inadvertent disengagement from a safety line or a safety belt.

Another object of the instant invention is to provide a safety-hook construction which includes a pair of thumb tabs which are movable along one leg of a body of the safety hook for moving the safety hook to an open position.

A still further object of the instant invention is to provide a safety-hook construction of the type which includes a locking member, wherein means is provided for preventing the locking member from being moved laterally.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE INVENTION

Figure 1:
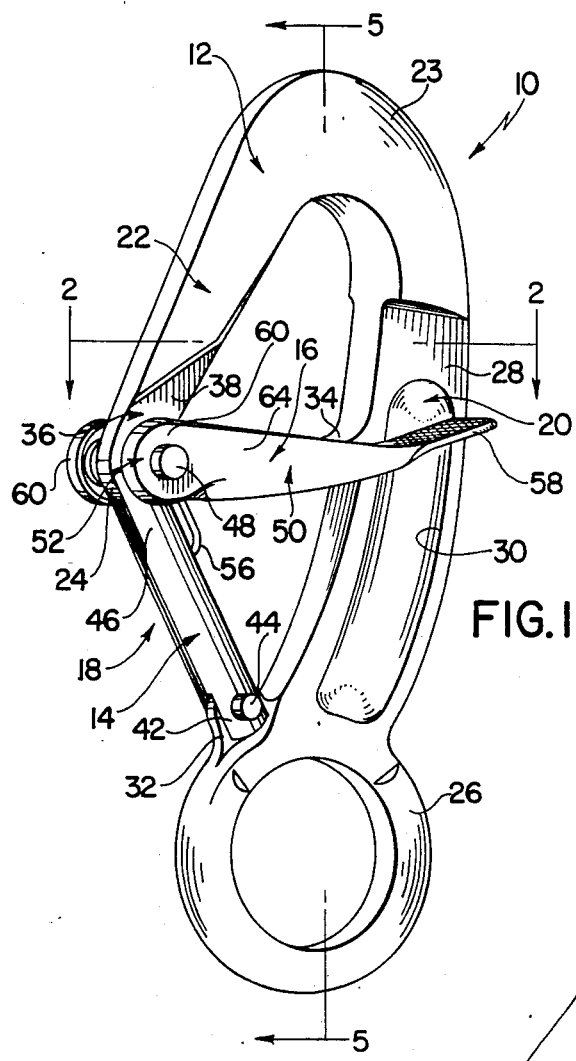
FIG. 1 is a perspective view of the safety hook of the instant invention.
Figure 2:
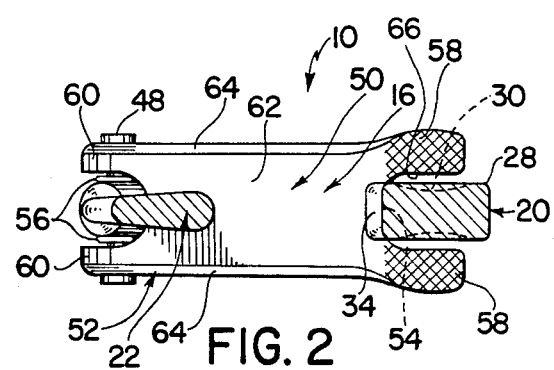
FIG. 2 is a sectional view taken along line 2—2 in FIG. 1.

Referring now the drawings, the safety hook of the instant invention is illustrated in FIGS. 1 through 5 and generally indicated at 10. The safety hook 10 comprises a hook-shaped body generally indicated at 12 and a latch assembly including, a closure member generally indicated at 14, and a locking member generally indicated at 16. The body 12 has an opening or mouth 18 formed therein, and the closure member 14 is pivotally attached to the body 12 so that it is alternatively positionable in the closed position illustrated in FIGS. 1, 3 and 5 wherein the closure member 14 obstructs the mouth 18, or the open position illustrated in FIG. 4 wherein the mouth 18 is substantially unobstructed by the closure member 14. The locking member 16 is pivotally attached to the closure member 14, and it is positionable in the locked position illustrated in FIGS. 1, 3 and 5 wherein it engages the body 12 to prevent the closure member 14 from being moved to the open position thereof, and the unlocked position illustrated in FIG. 4 wherein the closure member 14 can be pivoted inwardly to the open position thereof. Accordingly, the safety hook 10 can be effectively attached to an element, such as a ring or a loop on a safety belt, for securing a worker to a safety line. Further, once the closure member 14 is moved to the closed position and the locking member 16 is moved to the locked position, the locking member 16 prevents the safety hook 10 from being inadvertently opened, and hence the safety hook 10 can be used to provide a reliable and safe interconnection to a safety line or the like.

The body 12 is preferably cast from a suitable rugged and durable metal in a hook-shaped configuration such as illustrated. The body 10 preferably comprises spaced first and second legs 20 and 22, respectively, which extend from an apex portion 23 of the body 12 and cooperate to define the open mouth 18. The second leg 22 terminates in an end 24 and the first leg 20 terminates in an integrally formed ring 26, and flattened sides 28 are formed on the leg 20 so that they extend along the intermediate portions thereof to the ring 26. Elongated recesses 30 are formed in the flattened sides 28 so that they also extend from the intermediate portions of the leg 20 to the ring 26. Integrally formed with the leg 20 adjacent the ring 26 is an apertured tab 32 which projects generally towards the terminal end 24 of the second leg 22 and cooperates therewith to define the mouth 18 along one side of the body 12. Also integrally formed with the first leg 20 along the inner edge thereof is a bump 34 which extends a short distance generally toward the terminal end 24 of the second leg 22 from the intermediate portion of the first leg 20. The second leg 22 extends from the apex portion 23 in spaced relation to the first leg 20 and terminates in a terminal portion generally indicated at 36 which terminates in the terminal end 24, the terminal portion 36 having flattened sides 38 which define a reduced thickness therein. Formed on the inner side of the terminal portion 36 is a notch 40 which faces inwardly and generally toward the upper interior portion of the body 12.

The closure member 14 comprises a notched first end 42 which is pivotally secured on the tab 32 with a first pin 44 and a notched second end 46 through which an elongated second pin 48 extends. The closure member 14 is dimensioned and configured so that when the first end 42 thereof is secured on the tab 32 the terminal portion 36 of the second leg 22 is receivable in the notch in the second end 46 and so that the second pin 48 is receivable in the notch 40 in the terminal portion 36. The closure member 14 and the body 12 are further dimensioned and configured so that the pin 48 is removable from the notch 40 by pivoting the closure member 14 inwardly and so that the second end 46 of the closure member 14 is movable to a position wherein it is closely adjacent the first leg 20.

The locking member 16 comprises a main portion 50 having a notched end 52 and a free end 54, a spring 56 and a pair of thumb tabs 58 which are integrally attached to the main portion 50 and extend therefrom in spaced relation beyond the free end 54. The notched end 52 is defined by a pair of apertured tabs 60, and the second end 46 of the closure member 14 is received between the tabs 60 and pivotally secured thereto with the second pin 48. The spring 56 is assembled on the pin 48 between the tabs 60 and the notched end 46 so that the spring 56 engages both the closure member 14 and the locking member 16 to urge them to a position wherein they are pivotally separated. In other words, the spring 56 operates to bias the locking member 16 to a position wherein the free end 54 is separated from the first notched end 42 by an increased amount. The main portion 50 of the locking member 16 extends from the notched end 52, and it is dimensioned so that when it is pivoted to the locked position thereof illustrated in FIGS. 1, 3 and 5, the free end 54 engages the bump 34 to prevent the locking member 16 from being pivoted further outwardly with respect to the closure member 14. The main portion 50 of the locking member 16 is preferably defined by a top wall 62 and a pair of spaced side walls 64 which extend from opposite sides of the top wall 62 to define an open interior area in the main portion 50. Accordingly, the closure member 14 is actually receivable in the interior of the locking member 16 between the side walls 64 when the locking member 16 is pivoted to a position wherein it is adjacent the closure member 14. The thumb tabs 58 extend from the main portion 50 beyond the free end 54 thereof in spaced relation so that they extend outwardly along the opposite flattened sides 28 on the body 12. In this connection, the thumb tabs 58 cooperate to define a notch 66 which is dimensioned to receive the portion of the first leg 20 which is defined by the flattened sides 28 therein. The main portion 50 is preferably dimensioned so that the length thereof is substantially equal to the length of the closure member 14, whereas the overall length of the locking member 16, including the thumb tabs 58, is somewhat greater than the overall length of the closure member 14; and accordingly, as the locking member 16 is pivoted toward the closure member 14, the thumb tabs 58 travel along the opposite sides 28 with the first leg 20 received in the notch 66 until the thumb tabs 58 are positioned adjacent the ring 26. The recesses 30 which are formed along the opposite sides of the first leg 20 are provided to further prevent the first leg 20 from interfering with the movement of the thumb tabs 58 as they are moved therealong.

Figure 3:
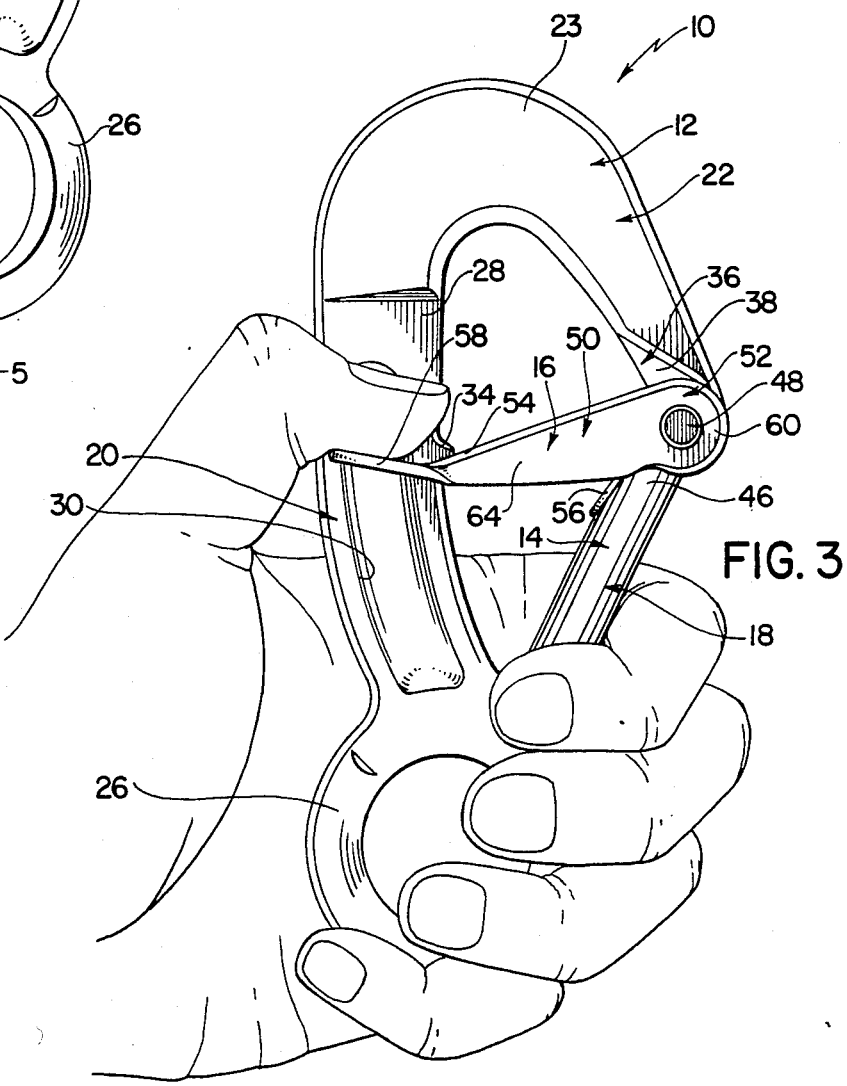
FIGS. 3 and 4 are perspective views illustrating the operation of the safety hook in the closed and open positions thereof, respectively.
Figure 4:
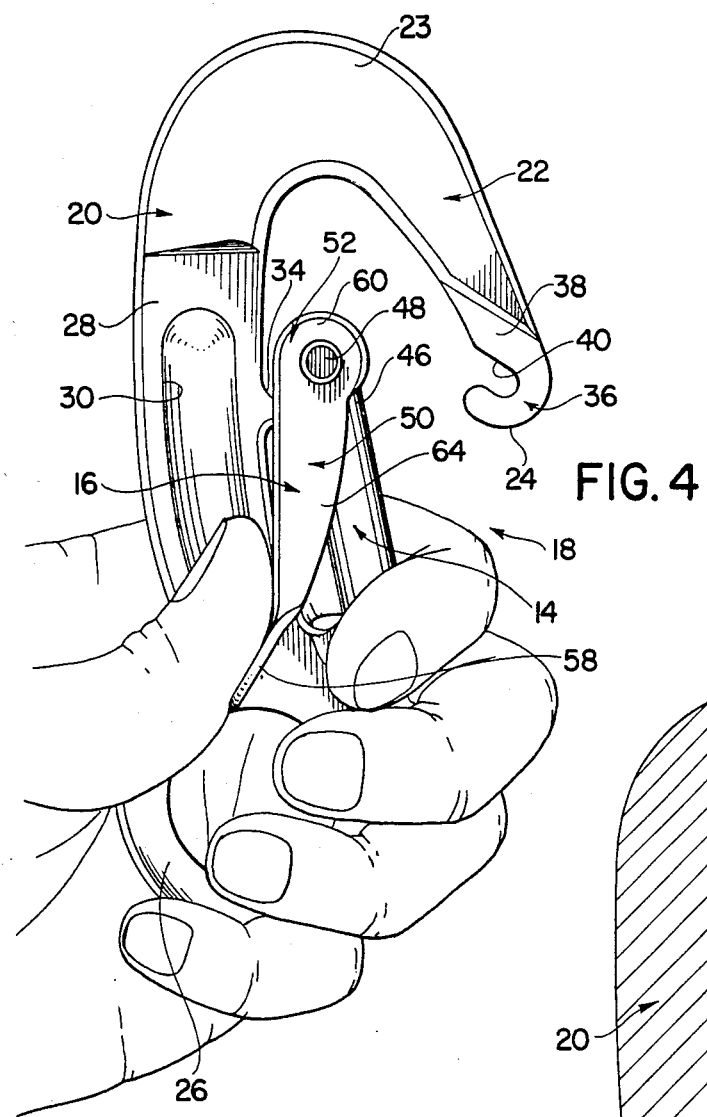
Figure 5:
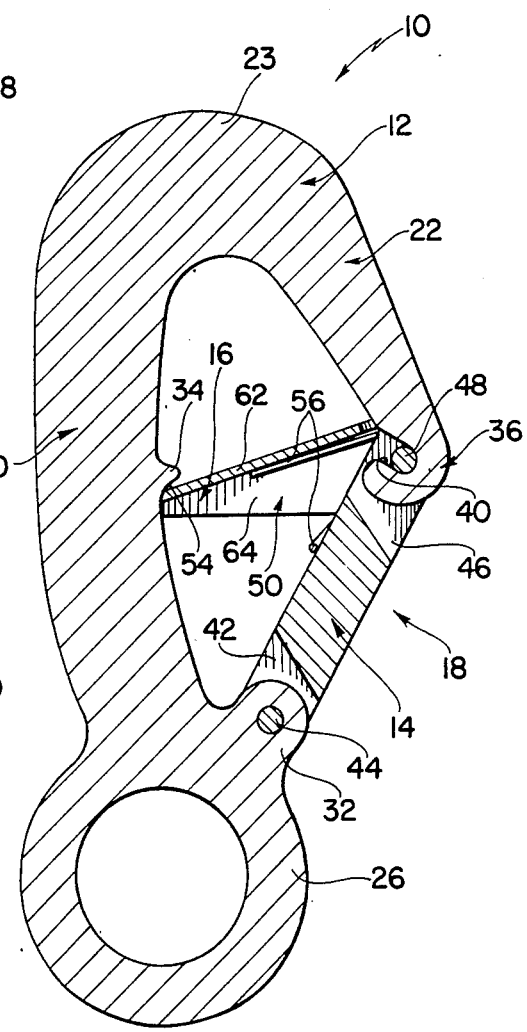
FIG. 5 is a sectional view taken along line 5—5 in FIG. 1.

The use and operation of the safety hook 10 is illustrated most clearly in FIGS. 3 and 4. Under normal conditions, the closure member 14 is disposed in the closed position thereof wherein it obstructs the mouth 18, and the pin 48 is received in the notch 40, and the locking member 16 is disposed in the locked position thereof wherein it extends from the terminal portion 36 of the second leg 22 to the bump 34 on the first leg 20 and wherein the thumb tabs 58 extend outwardly along the opposite sides 28 of the first leg 20. Accordingly, the bump 34 retains the locking member 16 from bein pivoted further outwardly with respect to the closure member 14 by the spring 56. When the locking member 16 is in this position, it prevents the pin 48 from being withdrawn from the notch 40 and it thereby prevents the closure member 14 from being inadvertently pivoted inwardly. In order to move the safety hook 10 to the open position thereof wherein the mouth 18 is substantially unobstructed, the safety hook 10 is positioned in the hand of an operator so that the ring 26 is disposed in the palm of the hand, so that the forefinger extends around the tab 32 and the first notched end 42, and so that the thumb engages the upper surface of one of the tabs 58. Thereafter, the locking member 16 is mvoed to the unlocked position thereof, and the closure member 14 is simultaneously moved to the open position thereof by moving the thumb of the hand toward the ring 26 so that the tabs 58 are drawn along the opposite sides 28 of the first leg 20 toward the ring 26. As the locking member 16 is pivoted toward the closure member 14 in this manner, it no longer prevents the pin 48 from being removed from the notch 40 so that the closure member 14 is free to pivot inwardly. Further, since the locking member 16 is somewhat longer than the closure member 14, as the tabs 58 are moved toward the ring 26, the closure member 14 is automatically pivoted inwardly so that the pin 48 is disengaged from the notch 40 and so that the mouth 18 is no longer fully obstructed by the closure member 14. The closure member 14 can also be pivoted inwardly with the index finger once the locking member 16 has been moved to an unlocked position. In any event, when the thumb tabs 58 have been moved downwardly so that they are positioned adjacent the ring 26, the closure member 14 is received between the side walls 64 of the main portion 50 of the locking member 16, and the locking member 16 and the closure member 14 are positioned adjacent the inner edge of the first leg 20 so that the mouth 18 is substantially unobstructed. When the safety hook 10 is in this position, it can easily be attached to or detached from a ring or the like to attach an operator to or to detach an operator from a safety line. However, when the thumb tabs 58 are thereafter released, the spring 56 causes the locking member 16 to be pivoted outwardly with respect to the closure member 14 so that the thumb tabs 58 are moved upwardly along the sides 28 toward the bump 34 until the free end 54 engages the bump 34. Simultaneously, the closure member 14 is pivoted outwardly from the first leg 20 until the pin 48 is once again received in the notch 40. In other words, the spring 56 automatically moves the locking member 16 to the locked position thereof and it simultaneously moves the closure member 14 to the closed position thereof.

It is seen, therefore, that the instant invention provides an effective safety-hook construction. The safety hook 10 is easily operable with one hand so that an operator can quickly and easily attach it to a ring or loop element on a safety line or to a safety belt. The thumb tabs 58 allow the safety hook 10 to be operated quickly and easily without requiring an operator to position a thumb or a finger in the interior of the body 12. Further, because the locking member 16 is somewhat longer than the closure member 14, when the thumb tabs 58 are depressed, the closure member 14 is automatically pivoted inwardly so that the safety hook 10 is moved to the open position thereof. In addition, because the thumb tabs 58 extend along opposite sides 28 of the first leg 20, they effectively prevent lateral movement of the locking member 16 with respect to the first leg 20. Hence, it is seen that the safety hook of the instant invention represents a significant improvement over the heretofore-available safety hooks, and that therefore the instant invention represents a significant advancement in the art.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. In a safety-hook construction of the type comprising a hook-shaped body having first and second legs which cooperate to define a mouth on said body, and latch means which includes a closure member and a locking member, said closure member being pivotally attached to said first leg and movable between a closed position wherein said mouth is obstructed by said closure member and an inwardly pivoted open position wherein said mouth is at least partially unobstructed, said locking member being pivotally mounted on said closure member, said locking member having a free end and being biased to a locked position wherein said free end engages the inner edge of said first leg for preventing said closure member from being pivoted inwardly to said open position but being pivotable toward said closure member to an unlocked position to allow said closure member to be pivoted to said open position, the improvement comprising said latch means including thumb tab means on said locking member and extending past the free end thereof and outwardly along a side of said first leg when said locking member is in the locked position thereof, said thumb tab means being depressible to pivot said locking member toward the unlocked position thereof, said latch means being dimensioned and configured so that when said thumb tab means is depressed to pivot said locking member toward the unlocked position thereof, said closure member is simultaneously and automatically pivoted inwardly toward the open position thereof.

2. The safety-hook construction of claim 1 further comprising a pair of said thumb tabs extending outwardly from said locking member along opposite sides of said first leg when said locking member is in the locked position thereof.

3. In the safety-hook construction of claim 2, said thumb tabs cooperating to define a notch therebetween, said first leg being received in said notch so that said thumb tabs retain said locking member free end against lateral movement with respect to said first leg.

4. In the safety-hook construction of claim 3, said closure member and said locking member being dimensioned and configured so that when said locking member is moved to the unlocked position thereof, said thumb tabs travel along opposite sides of said first leg to retain said first leg in said notch.

5. In the safety-hook construction of claim 4, said first leg having recesses formed along the opposite sides thereof, said thumb tabs traveling adjacent said recesses when said locking member is moved between the open and closed positions thereof.

6. In the safety-hook construction of claim 1, the overall length of said locking member including said thumb tab means being greater than the length of said closure member.

* * * * *